March 13, 1951   J. FOSSA   2,544,661
APPARATUS FOR DISPENSING THERMOPLASTIC ADHESIVE
Filed Dec. 31, 1946   3 Sheets-Sheet 2

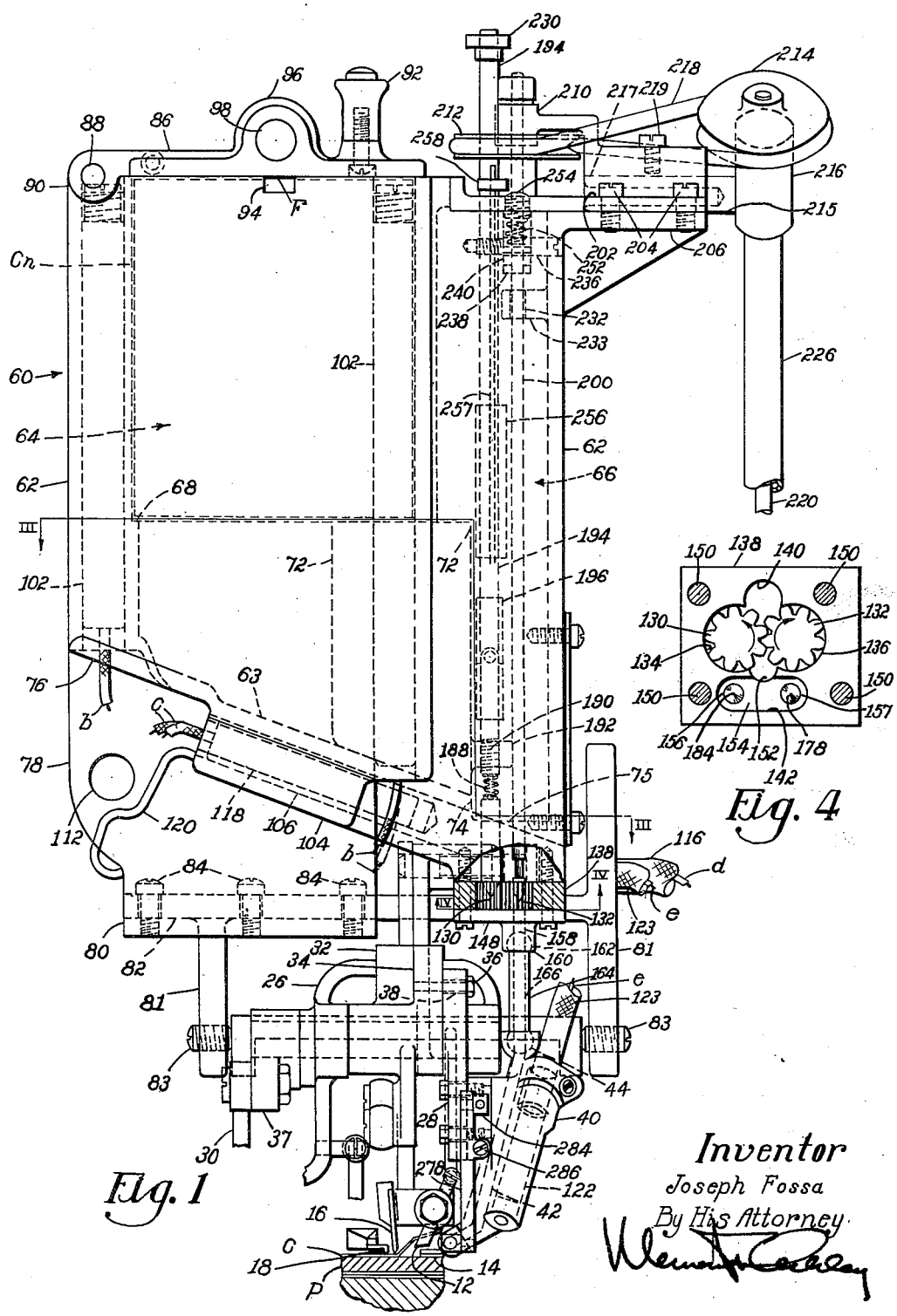

Inventor
Joseph Fossa
By His Attorney

March 13, 1951         J. FOSSA         2,544,661
APPARATUS FOR DISPENSING THERMOPLASTIC ADHESIVE
Filed Dec. 31, 1946         3 Sheets-Sheet 3
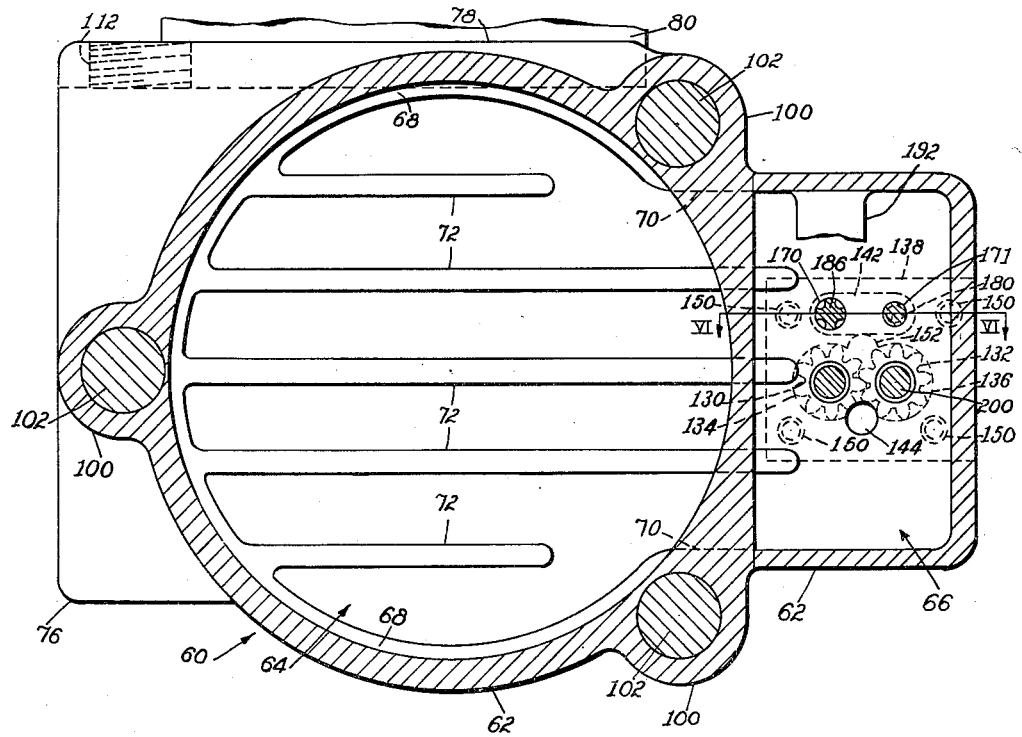
Inventor
Joseph Fossa
By His Attorney Patented Mar. 13, 1951

2,544,661

UNITED STATES PATENT OFFICE 2,544,661

APPARATUS FOR DISPENSING THERMOPLASTIC ADHESIVE

Joseph Fossa, Hamilton, Mass., assignor to United Shoe Machinery Corporation, Flemington, N. J., a corporation of New Jersey Application December 31, 1946, Serial No. 719,423

10 Claims. (Cl. 12—80)

This invention relates to apparatus for dispensing thermoplastic adhesive from a container, and is herein illustrated as associated with a lasting machine of the type disclosed in United States Letters Patent No. 2,476,290, granted July 19, 1949, on an application filed in my name. However, it is to be understood that the novel apparatus is not limited to dispensing adhesive during a lasting operation or to use in a machine organization of the exact character exemplified in the mentioned application.

Thermoplastic adhesive, which is solid at normal temperature, is usually marketed in cylindrical containers such, for example, as tin cans or paper cartons, into which it is poured while in a molten state and allowed to solidify. In order to use the adhesive from containers of this sort, it is necessary, after removing the cover of the container, to chip, or otherwise break, the adhesive out of the container and into small pieces which are placed in a heated receptacle, such, for example, as the heated container of the machine of the above-mentioned application, to be melted. This manner of removing the adhesive from its container is not only laborious and inefficient from the standpoint of economy, inasmuch as considerable quantities of the adhesive are lost in the process of breaking it out of the container, but also many of the larger pieces, retrieved from the floor or elsewhere, may be contaminated with particles of dirt, or other extraneous matter, which will clog the rather small passages through which the molten adhesive must travel to a point of use. In addition, because of the relatively slow rate at which heat is conducted through the adhesive sufficiently to melt it thoroughly, after it is placed in the heated receptacle; should the supply therein run low, or even become exhausted, without the knowledge of the operator, it would be necessary for him to wait a considerable time, after replenishing the supply, before the adhesive would be ready for use.

It is an object of this invention to provide a novel and improved apparatus for dispensing thermoplastic adhesive from a container in a manner which is highly efficient and economical both from the standpoint of time and labor. With this end in view, the herein illustrated apparatus is arranged to dispense the adhesive directly from the container in which it is received thereby eliminating any danger of loss and/or contamination of the adhesive, as above noted, and comprises a metallic receptacle having side and bottom walls defining both an upper space, for receiving an inverted open container of the adhesive with the container substantially in contact with the side wall of the receptacle, and a lower space of a capacity substantially equal to that of the container for receiving adhesive therefrom; together with means for heating the side and bottom walls of the receptacle to free the adhesive from the container and thus to cause it to pass into the lower space of the receptacle from which it may be pumped, or otherwise delivered, to a point of use.

More particularly, and in accordance with a feature of the invention, the receptacle is formed with a pair of adjacent chambers, one of which has an upper portion of substantially the same cross-sectional area as that of the container, herein illustrated as cylindrical in shape, with an open upper end, and a lower portion of a smaller cross-sectional area to provide a shoulder for supporting an inverted open container of adhesive which is introduced through the open upper end of the upper portion. The lower portion of the first chamber communicates with the other adjacent chamber to afford a combined space, exclusive of the upper portion of the first chamber, of a capacity substantially equal to that of the container. A cover is provided for closing the open upper end of the cylindrical chamber, which cover is arranged to contact the bottom of the container. The walls of the receptacle, together with the cover, are heated in order quickly to free the adhesive from its container from which it passes into the lower portion of the cylindrical chamber, and is there thoroughly melted. In order to facilitate the latter action, in accordance with a further feature of this invention, this lower portion of the cylindrical chamber is traversed by a plurality of fins for conducting heat into the body of the adhesive after it has been delivered from the container. From this lower portion, the melted adhesive is delivered to a point of use by means of a pump, preferably located in the adjacent chamber, and in order to insure an ample supply of molten adhesive at all times, there is also associated with this chamber a float for indicating the level of adhesive therein.

The above and other objects and features of the invention will appear in the following detailed description of a preferred embodiment thereof, illustrated in the accompanying drawings, and will be pointed out in the claims.

In the drawings,

Fig. 1 is a view, in front elevation, of apparatus embodying features of the invention, shown associated with a lasting machine;

Fig. 3 is a sectional view of the apparatus taken on the line III—III of Fig. 1, looking in the direction of the arrows;

Fig. 4 is a sectional view of the adhesive delivering pump, forming a component part of the apparatus, taken on the line IV—IV of Fig. 1, looking in the direction of the arrow;

Fig. 5 is a view, at an enlarged scale, of a portion of the apparatus which is shown partially broken away in Fig. 1;

Fig. 6 is a sectional view of that portion of the apparatus shown in Fig. 5 taken on line VI—VI of Fig. 3, looking in the direction of the arrows;

Figures 2, 7, 8:
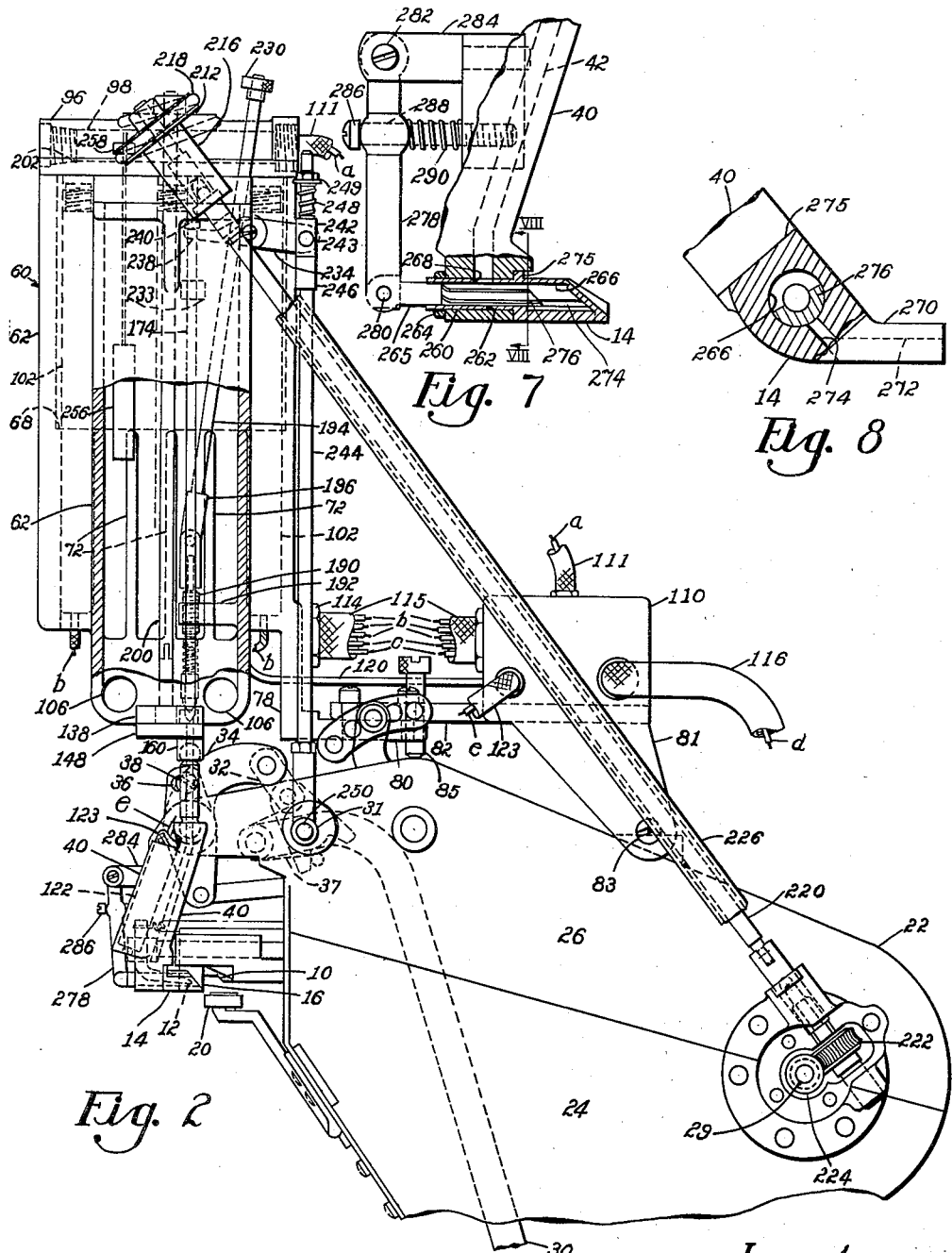
Fig. 2 is a view in side elevation of the apparatus illustrated in Fig. 1.
Fig. 7 is a view, at an enlarged scale, of the adhesive-applying nozzle forming part of the machine with which the apparatus is associated.
Fig. 8 is a view, at an enlarged scale and partly in section, of a portion of the adhesive-applying nozzle shown in Fig. 7.

Referring to the drawings, and especially Figs. 1 and 2 thereof, the novel adhesive-dispensing apparatus is therein illustrated as applied to a lasting machine of the type disclosed in the above-mentioned patent, the operating elements of which comprise, a rear gripper jaw 10, a front gripper jaw 12, a combined shoe-bottom rest and lasting shield 14, a presser feed-foot 16, a feed-retaining finger 18 and an edge-gage roll 20. These elements are mounted on and actuated by mechanism driven by a main shaft 29 contained within a hollow head construction 22 including a lower portion 24 and an upper removable cover part 26. As in the machine of the above-mentioned patent, the combined shoe-bottom rest and lasting shield 14 also serves as a nozzle through which adhesive is applied to a shoe-bottom part such, for example, as the bottom face of a platform P, see Fig. 1, for the purpose of adhesively securing thereto the lasting margin of a cover C, after the cover has been tensioned by the gripper jaws 10 and 12 and pressed against the platform by the presser feed-foot 16 during the operation of the lasting machine.

As in the prior machine, the combined shoe-bottom rest, lasting shield and nozzle 14, hereinafter referred to as the nozzle, is associated with an arm 28 which is arranged to be swung, to move the nozzle to and from the operative position in which it is shown, by means of mechanism including a treadle-actuated rod 30. However, in the herein illustrated machine this particular mechanism is similar to that described in United States Letters Patent No. 2,476,970, granted July 26, 1949, on an application filed in my name, and includes a toggle having a link 32 which is connected to a second arm 34, the arm 28 being adjustably connected to the arm 34 by means of a screw 36 and a slot 38. This toggle is associated with a shaft 31, which is rotated by the rod 30 and a crank arm 37. The nozzle 14 is mounted on the lower end of a holder 40, secured to the arm 28, in which is formed a passage 42 that terminates, at its upper end, in a spherical recess 44 the center of which is of the axis about which the arm 28 rotates as it is swung to move the nozzle into its operative position.

The adhesive-dispensing apparatus, with which this invention is concerned, comprises a metallic receptacle, indicated generally by the reference character 60, having side and bottom walls 62 and 63, respectively, shaped to provide two adjacent chambers 64 and 66. The chamber 64 is cylindrical in shape, see Fig. 3, and is divided, by a shoulder 68, into an upper portion of a diameter substantially equal to that of the container from which adhesive is to be dispensed, and a lower portion of slightly smaller diameter, see Fig. 1. The chamber 66 is generally rectangular in section, the side walls 62 of the receptacle being extended laterally from the cylindrical chamber 64, see Fig. 3, and these two chambers communicate through an opening 70 which extends from the level of the shoulder 68 downwardly to the bottom wall 63 and across the full width of the chamber 66. Formed integrally with the side and bottom walls of the receptacle, in the lower portion of the chamber 64, are a series of fins 72, five in number, three of which are longer than the other two and extend through the opening 70 into the chamber 66. The bottom wall 63 of the receptacle slopes downwardly from the chamber 64 toward the chamber 66 to the ends of the longer fins and, after dropping vertically at 74, extends horizontally at 75 to form the bottom of the chamber 66, Figs. 1 and 5. This bottom wall is also extended laterally from the side wall 62 of the receptacle to provide a flange 76 which on one side has a depending skirt portion 78. From this skirt portion there extends rearwardly a horizontal flange 80 which is secured to the forward end of a platform 82 by means of screws 84, 84, see Fig. 2. This platform is pivotally mounted on the cover part 26, by means of arms 81, 81 and pivot screws 83, 83, Figs. 1 and 2, and is provided with an adjustable stop screw 85 which rests on the cover part.

The chamber 64 is open at the top of the receptacle, to receive an inverted open container of the adhesive, illustrated in Fig. 1 as a cylindrical can Cn, and a cover 86 is provided for closing the opening after the can has been inserted. The cover 86 is pivoted by means of a pin 88, in a boss 90 that is formed integrally with the receptacle and a handle 92 is provided for use in swinging the cover upwardly to uncover the opening when a can is being inserted or removed. For the purpose of facilitating the removal of the can, after the adhesive has been dispensed therefrom, diametrically opposite notches are provided, one being indicated at 94 in Fig. 1, through which the ends of a pair of tongues may be inserted to engage the flange F of the can. As above stated, the diameter of the upper portion of the chamber 64 is substantially equal to that of the can and the distance from the lower face of the cover 86, when it is in closed position, to the shoulder 68, upon which the open end of the can rests, is substantially the same as the height of the can. Accordingly, the bottom and sides of the can are substantially in metal-to-metal contact with the cover 86 and the side wall 62 of the chamber 64.

For applying heat to the can Cn; to free the thermoplastic adhesive therein and cause it to pass into the lower portion of the chamber 64, and also for thoroughly melting the adhesive in this lower portion of the chamber 64, as well as for maintaining the adhesive in this molten state as it flows through the opening 70 into the chamber 66; the cover 86, side wall 62 and bottom wall 63 of the receptacle, and also the fins 72, are heated electrically in the following manner. The cover 86 has a transversely extending rib 96 in which is positioned an electrical heating unit 98, having a lead wire a, see Figs. 1 and 2. The side wall 62 is formed with three enlargements 100 in which are positioned electrical heating units 102, having lead wires b, b, b, see Figs. 2 and 3, and the bottom wall 63 is thickened at 104 to receive two electrical heating units 106, having lead wires c, c, see Figs. 1 and 2.

The lead wires a, b, b, b, c, c are housed in suitable conduits and are connected to a source of electrical energy through a junction box 110, mounted on the platform 82, see Fig. 2. In order to avoid confusion, these lead wires and their conduits are shown partially broken away in the drawings, but it will be readily understood that these wires extend from their respective heating units to the junction box in the manner indicated by the several reference characters in Figs. 1 and 2. The lead wire $a$ extends down from the top of the receptacle 60 to the box in a conduit 111, while the lead wires $b$, $b$, $b$, and $c$, $c$, are brought out through a hole 112, in the skirt portion 78, which is threaded to receive a thimble 114 of a conduit 115 in which this latter group of lead wires is housed.

Electrical energy is supplied to the junction box through a main lead wire $d$, in a conduit 116. For controlling these six heating units, just described, a thermostat of conventional construction is provided and this thermostat is housed in the junction box 110. A controlling element 118, for this thermostat, is positioned in the thickened portion 104 of the bottom wall 63, between the heating units 106, 106, and this controlling element is connected to the thermostat by means of a pipe 120, see Figs. 1 and 2. The nozzle 14 is also heated electrically, the holder 40 being enlarged to receive an electrical heating unit 122, having a lead wire $e$. This lead wire is housed in a conduit 123 and is connected to the source of electrical energy in the box 110, see Figs. 1 and 2.

The molten adhesive is delivered from the lower portion of the chamber 66 to its point of use, i. e., the nozzle 14, by means of a gear pump comprising a pair of gears 130, 132. These two gears rotate in mesh, inside of two overlapping cylindrical recesses 134, 136 which are formed in a pump block 138, see Figs. 1, 4 and 5, and force adhesive from a receiving chamber 140, formed in the pump block, to a delivery chamber 142, also formed in the pump block, see Fig. 4. The receiving chamber 140 is formed as a bore passing through the block 138 and in line with a bore 144, of the same diameter, which extends downwardly through the bottom wall 63 from the horizontal portion 75 thereof, to a machined surface 146, against which the pump block 138 is clamped by means of a cover plate 148 and screws 150. The chamber 140 opens into the recesses 134 and 136 while the chamber 142 is connected thereto by a lateral opening 152, see Figs. 3 and 4. The latter chamber does not extend entirely through the pump block 138, there being a thin wall 154 left at the top of the block in which there are two openings 156 and 157, see Figs. 4 and 6. A third opening, leading from the chamber 142, is also provided in the form of a passage 158 which extends downwardly, through a boss 160 on the cover plate, to a spherical recess 162 formed in the lower end of the boss. Interposed between this spherical recess and the spherical recess 44, in the upper end of the holder 40, there is a connecting pipe 164 having a bore 166 which is in communication with the passage 42 and also with the passage 158, see Fig. 1.

The openings 156 and 157 are in line, respectively, with two bores 170, 171 which extend upwardly from the surface 146 into the lower portion of the chamber 66, see Fig. 6. The passage 158 is alined with the bore 171 in which is positioned a valve rod 174. On the lower end of this valve rod there is a cylindrical portion 176 of the same diameter as the bore 171 and this cylindrical portion terminates in a conical end 178. Above the cylindrical portion 176, the rod 174 has a portion of reduced diameter 180. When the rod 174 is moved downwardly, to the position in which it is shown in Fig. 6, the conical end 178 seats on the upper end of the passage 158 and thus prevents discharge of adhesive therethrough to the nozzle 14. At the same time, the reduced portion 180 of the rod 174 affords a discharge passage through the bore 171 and upwardly from the chamber 142 back into the chamber 66. However, when the rod 174 is elevated to the position in which it is shown in Fig. 5, thereby raising the conical end 178 from the top of the passage 158 and opening this passage to the chamber 142, the cylindrical portion 176 enters the bore 171 to cut off discharge of adhesive therethrough. Accordingly, by elevating or depressing the rod 174, the output of the gear pump may be directed either to the nozzle 14 or back into the chamber 66. Positioned in the bore 170 is a by-pass valve 182 having a conical end 184, adapted to seat on the top of the opening 157, and a series of guide ribs 186 which engage the wall of the bore 170. A spring 188 is interposed between this valve and an adjustable abutment 190, threaded into a web 192 which extends from the side wall 62, Fig. 5. For rotating the abutment 190 to vary the force applied by the spring 188 to the valve 182, a shaft 194 is connected thereto by means of a universal joint 196. As will be understood the valve 182 serves as a relief valve for regulating the pressure at which adhesive is delivered to the nozzle 14 by the gear pump. When this valve is elevated, against the force of the spring 188, the spaces between the ribs 186 provide passageways for the discharge of adhesive from the chamber 142 back into the chamber 66.

The gear 130 is driven by the gear 132 which, in turn, is rotated by means of a shaft 200, formed integrally therewith, and extending upwardly through the chamber 66. The upper end of this chamber is closed by a cover plate 202 which is held in place by means of screws 204 threaded into a supporting flange 206, see Fig. 1. The shaft 200, at its upper end, is journaled in a bearing 210 which is provided on the cover plate 202. Secured to the upper end of this shaft is a pulley 212 which is driven, from a pulley 214 supported on the cover plate in a bearing 216 by means of a belt 218. The bearing 216 is adjustably mounted on the cover plate 202 by means of a rectangular arm 215, which is slidably received in a correspondingly shaped guideway 217, and is held in adjusted position in the guideway by means of a setscrew 219. The pulley 214 is connected to a shaft 220 which is driven from the main drive shaft 29 by means of helical gears 222 and 224, a housing 226, shown partly broken away, being provided to cover this shaft, Fig. 2. The belt 218 provides a friction drive for the shaft 200 so that if the machine were put into operation before the adhesive surrounding the gears 130, 132 had become molten, the belt would slip before undue strain had been applied to the parts.

The shaft 194 is extended through the cover plate 202 and is provided with a knurled knob 230 by means of which it may be rotated for the purposes explained above. The valve rod 174 also extends upwardly within the chamber 66 and is guided, at its upper end, by means of a bore 232 formed in a web 233 that is carried by the side wall 62, see Fig. 1. For reciprocating this valve rod, a lever 234 is fulcrumed on a pin 236 and this lever has a forked end 238 which embraces the rod just beneath a collar 240 thereon. The opposite end of this lever is pivotally connected to a sleeve 242, by means of trunnion pins carried by the sleeve, one of which is indicated by the reference character 243 in Fig. 2. This sleeve is slidably mounted on the upper end of an operating rod 244 and is urged yieldingly against a stop collar 246, on the rod, by means of a spring 248, the upper end of which bears against a stop nut 249 threaded on the rod. The operating rod is connected at its lower end to a crank pin 250 which is carried by the treadle-actuated shaft 31. The arrangement is such that, when the treadle is depressed and the nozzle 14 moved to its operative position as shown in Fig. 2, the operating rod is pulled downwardly by the crank pin 250, thus causing the forked end 238 of the lever 234 to be elevated and to move the valve rod 174 upwardly to the position shown in Fig. 5. The conical end 178 is now withdrawn from the top of the opening 158, so that the output of the gear pump will be directed to the nozzle 14, while the cylindrical portion 176 enters the bore 171 to cut off discharge of adhesive back into the chamber 66. Should the treadle be depressed before the adhesive in chamber 142 has become molten, spring 248 will yield before undue strain is imposed upon the parts. When the treadle is released, the rod 30 is elevated, by a spring not shown, and the shaft 31 is rotated in the opposite direction so that the operating rod 244 is elevated and the forked end 238 of the lever 234 moved downwardly away from the collar 240. For now moving the valve rod 174 downwardly, to seat the conical end 178 on the top of the opening 158, thereby to cut off delivery of adhesive to the nozzle 14, and to withdraw the cylindrical portion 176 from the bore 171, to permit the pump to by-pass through this bore and around the reduced portion 180 back into the chamber 66, a spring 252 is provided. This spring is interposed between the collar 240, on the valve rod 174, and a screw plug 254 which is threaded through the cover plate 202.

A hollow float 256 is located within the chamber 66 for the purpose of indicating the level of adhesive therein. This float is secured to the lower end of a rod 257 which extends upwardly and through the cover plate 202 where it is provided with a collar 258. When the lower portions of the chambers 66 and 64 are filled with adhesive to the level of the shoulder 68, this float occupies the position shown in Fig. 1 and the collar 258 is elevated above the top of the cover plate. It will be understood that the adhesive must drop slightly below this level before any adhesive can flow out of the inverted can Cn, and that the adhesive will be maintained substantially at this level so long as any adhesive remains in the can. Accordingly, when the level of adhesive in the chamber 66 drops sufficiently for the collar 258 to rest on the cover plate 202, the supply in the inverted can Cn will have been entirely exhausted.

The nozzle 14 through which the adhesive is delivered to the point of use, has a neck 260 which passes through a bore 262 in the lower end of the holder 40, see Fig. 7, and is held in place by means of a nut 264 and a shoulder 275, formed on the nozzle. A bore 266 extends through this neck and into the body of the nozzle, as shown in Figs. 7 and 8, and a hole 268 connects this bore with the passage 42 in the holder. The nozzle, at its forward end, has a laterally extending lip 270 which is undercut at 272 to provide a shallow recess into which adhesive is delivered through an elongated slot 274 that opens to this space from the bore 266. For varying the effective width of this slot, and hence the width of the band of adhesive applied by the nozzle, a semi-cylindrical sleeve 276 is slidably mounted within the bore 266. This sleeve has a cylindrical end 265 for closing the bore 266 and is connected to the end of an arm 278 by means of a pin 280. This arm is pivoted, by means of a screw stud 282, to a bracket 284 that is carried by the holder 40. An adjusting screw 286 passes through a bore 288, in the arm 278, and is threaded into the block 40. The head of this screw bears against one side of the arm 278 and a coil spring 290, surrounding the screw 286, bears against the other side of this arm. By rotating the screw 286, the arm 278 may be caused to move one way or the other and the sleeve 276 shifted in the bore 266 so as to uncover more or less of the slot 274 and thus vary the effective width thereof.

While the mode of operation of the adhesive-dispensing apparatus should be easily understood from what has been said above, it will now be described in more detail. When the apparatus is first put in use, the cover 86 is raised, an open can of adhesive is inverted and placed within the upper portion of the chamber 64, the top of the inverted can resting on the shoulder 68, and the cover 86 then closed. The side wall 62 and the cover 86 being heated by the heating units 102 and 98, respectively, and the side and bottom of the can being in substantially metal-to-metal contact with the wall 62 and the cover 86, the body of adhesive in the can is soon loosened so as to cause it to fall by gravity into the lower portion of the chamber 64. As the body of adhesive thus descends, it is separated by the fins 72, 72 which divide it into smaller portions and conduct heat throughout the body thereof. As a result of the heating action of these fins, and also of the lower portion of the side walls 62 and the bottom wall 63, this body of adhesive is thoroughly melted so as to flow through the opening 79 into the lower portion of the chamber 66 and, through the bore 144, to the gear pump 130, 132. However, inasmuch as the lasting machine would not now be in operation, this pump will merely discharge the adhesive back into the chamber 66. Thus, when the adhesive has been entirely dispensed from the first can, as indicated by the elevation of the float and by the raising of the collar 258 away from the cover plate 202, this empty can is immediately replaced by a second full can.

When the adhesive in this second can is melted it cannot flow therefrom until the lasting machine is put in operation and the valve 176 elevated to connect the pump to the nozzle 14, since the contents of the first can will have filled the lower portion of the chambers 64 and 66 to the level of the tops of the fins and to the bottom of the inverted second can. However, when the lasting machine is put in operation, the adhesive will be pumped to the nozzle, from the lower portion of the chamber 66, and the level of adhesive therein will be lowered to permit more adhesive to be discharged from the second can at a rate commensurate with the rate at which adhesive is being discharged through the nozzle. During this interval, the float 256 will occupy the position shown and the collar 258 will be elevated somewhat above the cover plate 202. As soon as all of the adhesive has been dispensed from the second can, by the delivery of an equal quantity through the nozzle, the level of adhesive in the chamber 66 will immediately drop and the collar 258 will soon come to rest on the cover plate. The apparatus is now ready for the next, or third, can of adhesive which is then inserted. This procedure is continued, as the lasting machine is operated and adhesive used at the nozzle, so that there is always available for use a quantity of adhesive, in molten condition, equal to the contents of one can, in the lower portions of the chambers 64 and 66, together with a reserve supply in the can which is in the upper portion of the chamber 64. Inasmuch as the interval required to loosen the adhesive from a can is much less than that in which a can full of adhesive can be discharged through the nozzle by the gear pump, if a new can is put in at the appropriate time, as indicated by the position of the collar 258, a continuous supply of fully molten adhesive will be available at all times. Inasmuch as the cans of adhesive need be opened only immediately before they are inserted, the danger of contamination is eliminated; and by melting the adhesive directly out of the can, a maximum economy in the use of the adhesive is effected. Also, where the lasting machine is used only intermittently throughout the day, the heat may be left on so that the machine will be ready for immediate use when desired, without danger of overheating the adhesive because of the automatic control of the temperature by the thermostat.

As has already been pointed out, the delivery of adhesive from the chamber 66 to the nozzle is controlled by the valve 176 which is conveniently operated from the treadle rod 30. In one position, this valve cuts off discharge back into the chamber 66 and opens the passage 158 for delivery of adhesive, by the gear pump, to the nozzle, and in its other position this valve cuts off delivery to the nozzle and opens up a bypass, through the bore 171, back into the chamber 66. Thus at those intervals when the lasting machine may be running, with the treadle not depressed and with no work in the machine, there is no appreciable load on the gear pump. When the treadle is depressed and the lasting machine put in operation, the pressure at which adhesive is delivered through the nozzle is controlled by the spring 188 which holds the valve 182 against its seat. This pressure, and accordingly the rate at which adhesive will be delivered through the nozzle, may be varied by rotating the threaded abutment 190, through the medium of the shaft 194 and its knob 230. Alternatively, the rate of delivery of adhesive may be varied by changing the sizes of the pulleys 212, 214, thus increasing or decreasing the speed of the pump, or a conventional type of expansible pulley may be used in place of the pulley 214, and the pump speed varied by adjusting the bearing toward or away from the pulley 212. When the delivery rate is thus varied, the valve 182 will be rendered inoperative by rotating the abutment 190 so as fully to compress the spring 188. Also, the width of the band of adhesive which is applied may be readily varied, to accommodate different working conditions, by rotating the adjusting screw 286 to change the position of the sleeve 276 in the bore 266 of the nozzle.

Having described the invention, what I claim as new and desire to secure by Letters Patent of the United States is:

1. Apparatus for dispensing, from a container, thermoplastic adhesive which is solid at normal temperature, comprising a metallic receptacle formed to provide a chamber with an upper portion of substantially the same cross-sectional area as that of said container, and a lower portion of smaller cross-sectional area to provide a shoulder between said chamber portions for supporting an inverted open container of the adhesive in said upper portion, and means for heating said receptacle to free the adhesive from said inverted container and cause it to be delivered to said lower portion.

2. Apparatus for dispensing, from a container, thermoplastic adhesive which is solid at normal temperature, comprising a metallic receptacle formed to provide a chamber with an upper portion of substantially the same cross-sectional area as that of said container and having an opening at its upper end, and a lower portion of smaller cross-sectional area to provide a shoulder between said chamber portions for supporting an inverted open container of the adhesive in said upper portion, a cover for closing said opening, and means for heating said receptacle and cover to free adhesive from said inverted container and cause it to be delivered into said lower portion of the chamber.

3. Apparatus for dispensing, from a container, thermoplastic adhesive which is solid at normal temperature, comprising a metallic receptacle formed to provide a chamber with an upper portion of substantially the same cross-sectional area as that of said container and having an opening at its upper end, and a lower portion of smaller cross-sectional area to provide a shoulder between said chamber portions for supporting an inverted open container of the adhesive in said upper portion, a cover for closing said opening adapted, when closed, to contact the bottom of the inverted container, and means for heating said receptacle and cover to free adhesive from said inverted container and cause it to be delivered into said lower portion of the chamber.

4. Apparatus for dispensing, from a container, thermoplastic adhesive which is solid at normal temperature, comprising a metallic receptacle formed to provide a chamber with an upper portion of substantially the same cross-sectional area as that of said container, and a lower portion of a smaller cross-sectional area to provide a shoulder for supporting an inverted open container of the adhesive in said upper portion, a plurality of fins, in heat-conducting relation to said receptacle and extending transversely of said lower portion of the chamber, for facilitating the melting of the adhesive after it has been delivered from the container into said lower portion, and means for heating said receptacle to free adhesive from said inverted container and cause it to be delivered to said lower portion.

5. Apparatus for dispensing, from a container, thermoplastic adhesive which is solid at normal temperature, comprising a metallic receptacle formed to provide a chamber with an upper portion of substantially the same cross-sectional area as that of said container and having an opening at its upper end, and a lower portion of smaller cross-sectional area to provide a shoulder for supporting an inverted open container of the adhesive in said upper portion, a cover for said opening, a plurality of fins in heat-conducting relation to said receptacle and extending transversely of said lower portion of the chamber, for facilitating the melting of adhesive after it has been delivered from the container into said lower space, and means for heating said receptacle and said cover to free adhesive from said inverted container and cause it to be delivered to said lower portion.

6. Apparatus for dispensing, from a container, thermoplastic adhesive which is solid at normal temperature, comprising a metallic receptacle formed to provide a chamber with an upper portion of substantially the same cross-sectional area as that of said container and having an opening at its upper end, and a lower portion of smaller cross-sectional area to provide a shoulder for supporting an inverted open container of the adhesive in said upper portion, a cover for said opening adapted, when closed, to contact the bottom of the inverted container, a plurality of fins in heat-conducting relation to said receptacle and extending transversely of said lower portion of the chamber, for facilitating the melting of adhesive after it has been delivered from the container into said lower space, and means for heating said receptacle and said cover to free adhesive from said inverted container and cause it to be delivered to said lower portion.

7. Apparatus for dispensing, from a container, thermoplastic adhesive which is solid at normal temperature, comprising a receptacle formed to provide a pair of adjacent chambers, one of said chambers being substantially cylindrical and having upper and lower portions, said upper portion being open at the top and of a diameter substantially equal to the diameter of the container and said lower portion being of smaller diameter to provide a shoulder for supporting an inverted and open container of the adhesive entirely within said upper portion, a cover for closing said opening, means affording communication between said lower portion of said first-mentioned chamber and the other of said chambers, below the level of said shoulder, means for heating said receptacle and cover to free adhesive from the container and cause it to flow into said lower portion and said other adjacent chamber, and means associated with said other adjacent chamber for delivering the adhesive therefrom to a point of use.

8. Apparatus for dispensing, from a container, thermoplastic adhesive which is solid at normal temperature, comprising a receptacle formed to provide a pair of adjacent chambers, one of said chambers being substantially cylindrical and having upper and lower portions, said upper portion being open at the top and of a diameter substantially equal to the diameter of the container and said lower portion being of smaller diameter to provide a shoulder for supporting an inverted open container of the adhesive entirely within said upper portion, a cover for closing said opening adapted, when closed, to contact the bottom of the container, means affording communication between said lower portion of said first-mentioned chamber and the other of said chambers, below the level of said shoulder, means for heating said receptacle and cover to free adhesive from the container and cause it to flow into said lower portion and said other adjacent chamber, and means associated with said other adjacent chamber for delivering the adhesive therefrom to a point of use.

9. Apparatus for dispensing, from a container, thermoplastic adhesive which is solid at normal temperature, comprising a receptacle formed to provide a pair of adjacent chambers, one of said chambers being substantially cylindrical and having upper and lower portions, said upper portion being open at the top and of a diameter substantially equal to the diameter of the container and said lower portion being of smaller diameter to provide a shoulder for supporting an inverted open container of the adhesive entirely within said upper portion, a cover for closing said opening, means affording communication between said lower portion of said first-mentioned chamber and the other of said chambers, below the level of said shoulder, said lower portion and the adjacent chamber, below said shoulder having a capacity at least as great as that of the container, means for heating said receptacle and cover to free adhesive from the container and cause it to flow into said lower portion and said other adjacent chamber, and means associated with said adjacent chamber for delivering the adhesive therefrom to a point of use.

10. Apparatus for dispensing, from a container, thermoplastic adhesive which is solid at normal temperature, comprising a receptacle formed to provide a pair of adjacent chambers, one of said chambers being substantially cylindrical and having upper and lower portions, said upper portion being open at the top and of a diameter substantially equal to the diameter of the container and said lower portion being of smaller diameter to provide a shoulder for supporting an inverted open container of the adhesive entirely within said upper portion, a cover for closing said opening, a plurality of fins in heat-conducting relation to the receptacle and extending transversely of said lower portion of the first-mentioned chamber, means affording communication between said lower portion of said first-mentioned chamber and the other of said chambers, below the level of said shoulder, said lower portion and the adjacent chamber, below said shoulder having a capacity at least as great as that of the container, means for heating said receptacle and cover to free adhesive from the container and cause it to flow into said lower portion and said other adjacent chamber, and means associated with said adjacent chamber for delivering the adhesive therefrom to a point of use.

JOSEPH FOSSA.

REFERENCES CITED

The following references are of record in the file of this patent:

UNITED STATES PATENTS

| Number | Name | Date |
|---|---|---|
| 1,085,782 | Angebrandt | Feb. 3, 1914 |
| 1,194,744 | Kahrs | Aug. 15, 1916 |
| 1,322,558 | Furber | Nov. 25, 1919 |
| 1,596,214 | O'Brien | Aug. 17, 1926 |
| 1,619,110 | Flannery | Mar. 1, 1927 |
| 1,751,713 | Pellerin | Mar. 25, 1930 |